United States Patent
Kang et al.

(10) Patent No.: US 9,426,702 B2
(45) Date of Patent: Aug. 23, 2016

(54) APPARATUS AND METHOD FOR PROVIDING PREAMBLE INFORMATION IN WIRELESS COMMUNICATION SYSTEM

(75) Inventors: Hyun-Jeong Kang, Seoul (KR); Ji-Yun Seol, Seongnam-si (KR); Yeong-Moon Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 13/530,591

(22) Filed: Jun. 22, 2012

(65) Prior Publication Data

US 2012/0327900 A1  Dec. 27, 2012

(30) Foreign Application Priority Data

Jun. 23, 2011 (KR) ........................ 10-2011-0061075

(51) Int. Cl.
*H04W 36/32* (2009.01)
*H04W 4/00* (2009.01)
*H04W 36/00* (2009.01)

(52) U.S. Cl.
CPC ................................. *H04W 36/0066* (2013.01)

(58) Field of Classification Search
CPC ................................. H04W 36/0055–36/0077
USPC .................... 370/328, 331–334; 455/436–444
See application file for complete search history.

(56) References Cited

U.S. PATENT DOCUMENTS

| | | | | |
|---|---|---|---|---|
| 7,376,424 B2 * | 5/2008 | Kim et al. | ..................... | 455/436 |
| 8,291,625 B2 * | 10/2012 | Lee | ................... | H04W 36/0066 37/331 |
| 8,351,384 B2 * | 1/2013 | Shrivastava | ......... | H04W 72/085 370/235 |
| 8,605,702 B2 * | 12/2013 | Proctor et al. | ................ | 370/342 |
| 2010/0008324 A1 * | 1/2010 | Lee | ................... | H04W 36/0066 370/331 |
| 2010/0008328 A1 * | 1/2010 | Maheshwari | ..... | H04W 36/0055 370/331 |
| 2010/0008332 A1 * | 1/2010 | Balachandran et al. | ...... | 370/336 |
| 2010/0098025 A1 * | 4/2010 | Chen | ................. | H04W 36/0061 370/331 |
| 2010/0227611 A1 * | 9/2010 | Schmidt | .............. | H04W 76/025 455/434 |
| 2010/0232331 A1 * | 9/2010 | Son et al. | ....................... | 370/311 |
| 2010/0272015 A1 * | 10/2010 | Chmiel | ................. | H04W 48/12 370/328 |

(Continued)

FOREIGN PATENT DOCUMENTS

| | | |
|---|---|---|
| JP | 2012-503378 A | 2/2012 |
| JP | 2013-515426 A | 5/2013 |

(Continued)

OTHER PUBLICATIONS

"Overview of IEEE P802.16m Technology and Candidate RIT for IMT-Advanced," IEEE 802.16 IMT-Advanced Evaluation Group Coordination Meeting, Jan. 13, 2010.*

(Continued)

*Primary Examiner* — Mark Rinehart
*Assistant Examiner* — Kenneth P Hunt
(74) *Attorney, Agent, or Firm* — Jefferson IP Law, LLP

(57) ABSTRACT

A method and an apparatus for providing preamble information in a wireless communication system are provided. The method of a Base Station (BS) of a first system for providing neighbor BS information of a second system in a communication environment covering the first system and the second system together includes generating a message comprising information indicating a superframe boundary of a neighbor BS of the second system, and transmitting the message comprising the information indicating the superframe boundary to a Mobile Station (MS).

18 Claims, 7 Drawing Sheets

(56) References Cited

U.S. PATENT DOCUMENTS

| | | | |
|---|---|---|---|
| 2010/0272017 A1* | 10/2010 | Terry | H04W 48/12 370/328 |
| 2010/0311422 A1 | 12/2010 | Jun et al. | |
| 2011/0076991 A1* | 3/2011 | Mueck | H04L 1/0003 455/414.1 |
| 2011/0117912 A1* | 5/2011 | Mahajan | H04W 48/12 455/434 |
| 2012/0039171 A1* | 2/2012 | Yamada | H04L 47/12 370/232 |
| 2012/0063374 A1* | 3/2012 | Lim | H04L 27/2602 370/281 |
| 2012/0094687 A1* | 4/2012 | Choi | H04W 4/021 455/456.1 |
| 2013/0109388 A1 | 5/2013 | Jung et al. | |

FOREIGN PATENT DOCUMENTS

| | | |
|---|---|---|
| KR | 10-2010-0135646 A | 12/2010 |
| KR | 10-2011-0004330 A | 1/2011 |

OTHER PUBLICATIONS

Shkumbin Hamiti,"The Draft IEEE 802.16m System Description Document," Apr. 30, 2008.*

IEEE 802.16 IMT-Advanced Evaluation Group Coordination Meeting "Overview of IEEE P802.16m Technology and Candidate RIT for IMT-Advanced" Jan. 13, 2010 , p. 39.*

Shkumbin Hamiti, "The Draft IEEE 802.16m System Description Document," Apr. 30, 2008, pp. 21-22.*

"Overview of IEEE P802.16m Technology and Candidate RIT for IMT-Advanced," Jan. 13, 2010.*

* cited by examiner

APPARATUS AND METHOD FOR PROVIDING PREAMBLE INFORMATION IN WIRELESS COMMUNICATION SYSTEM

PRIORITY

The present application claims the benefit under 35 U.S.C. §119(a) of a Korean patent application filed in the Korean Intellectual Property Office on Jun. 23, 2011, and assigned Serial No. 10-2011-0061075, the entire disclosure of which is hereby incorporated by reference.

BACKGROUND OF THE INVENTION

1. Field of the Invention

The present invention relates to a wireless communication system. More particularly, the present invention relates to a wireless communication system in an environment including a legacy system and a new system together.

2. Description of the Related Art

Next-generation communication systems are advancing to provide various high-speed and high-capacity services to Mobile Stations (MSs). Examples of the next-generation communication systems include an Institute of Electrical and Electronics Engineers (IEEE) 802.16 communication system and a Mobile Worldwide Interoperability for Microwave Access (WiMAX) communication system.

Compared to legacy systems, the next-generation communication systems are evolving to service high-speed data or to address issues in the implementation. In this evolution, various communication systems can coexist within the same region according to compatibility with the legacy communication system. For example, an IEEE 802.16m communication system evolved from the legacy system may be additionally installed in the region of an IEEE 802.16e communication system and the IEEE 802.16e system and the IEEE 802.16m system can coexist within the same region. In this case, the new system (e.g., the IEEE 802.16m system) should be able to support not only the service for a new MS (e.g., an IEEE 802.16m MS) but also the service for a legacy MS (e.g., an IEEE 802.16e MS) served by the legacy system (e.g., the IEEE 802.16e system), and the new MS should be also serviceable by the legacy system.

Hence, a method for supporting both of the legacy MS and the new MS is required in the evolution of the next-generation communication system. In particular, what is needed is a method for the legacy MS and the new MS to scan and hand over to a base station of some communication system other than the current communication system in the coexistence region of the legacy communication system and the new communication system.

In the meantime, the legacy communication system and the new communication system have different frame structures and thus the base station of each communication system transmits a preamble at a different location. As a result, the MS serviced by the base station of the legacy communication system cannot locate the preamble transmitted by the base station of the new communication system, and thus has difficulty in scanning or handing over to the base station of the new communication system.

Therefore, a need exists for an apparatus and method for providing preamble information in a wireless communication system.

The above information is presented as background information only to assist with an understanding of the present disclosure. No determination has been made, and no assertion is made, as to whether any of the above might be applicable as prior art with regard to the present disclosure.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for providing preamble information in a wireless communication system.

Another aspect of the present invention is to provide a method and an apparatus of a legacy base station for transmitting location information of a preamble of a new base station to a mobile station in a communication environment where a legacy system and a new system coexist.

Yet another aspect of the present invention is to provide a method and an apparatus of a mobile station accessing a legacy base station for scanning and handing over by obtaining location information of a preamble transmitted by a new base station in a communication environment where a legacy system and a new system coexist.

According to an aspect of the present invention, a method of a Base Station (BS) of a first system for providing neighbor BS information of a second system in a communication environment covering the first system and the second system together is provided. The method includes generating a message comprising information indicating a superframe boundary of a neighbor BS of the second system, and transmitting the message comprising the information indicating the superframe boundary to a Mobile Station (MS).

According to another aspect of the present invention, a method of an MS communicating with a BS of a first system for obtaining neighbor BS information of a second system in a communication environment covering the first system and the second system together is provided. The method includes receiving a message comprising information indicating a superframe boundary of a neighbor BS of the second system, from a BS of the first system, and identifying the BS of the second system using the received superframe boundary information.

According to yet another aspect of the present invention, an apparatus of a BS of a first system for providing neighbor BS information of a second system in a communication environment covering the first system and the second system together is provided. The apparatus includes a controller for generating a message comprising information indicating a superframe boundary of a neighbor BS of the second system, and a transceiver for transmitting the message comprising the information indicating the superframe boundary to an MS.

According to still another aspect of the present invention, an apparatus of an MS communicating with a BS of a first system for obtaining neighbor BS information of a second system in a communication environment covering the first system and the second system together is provided. The apparatus includes a transceiver for receiving a message comprising information indicating a superframe boundary of a neighbor BS of the second system, from a BS of the first system, and a controller for identifying the BS of the second system using the received superframe boundary information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
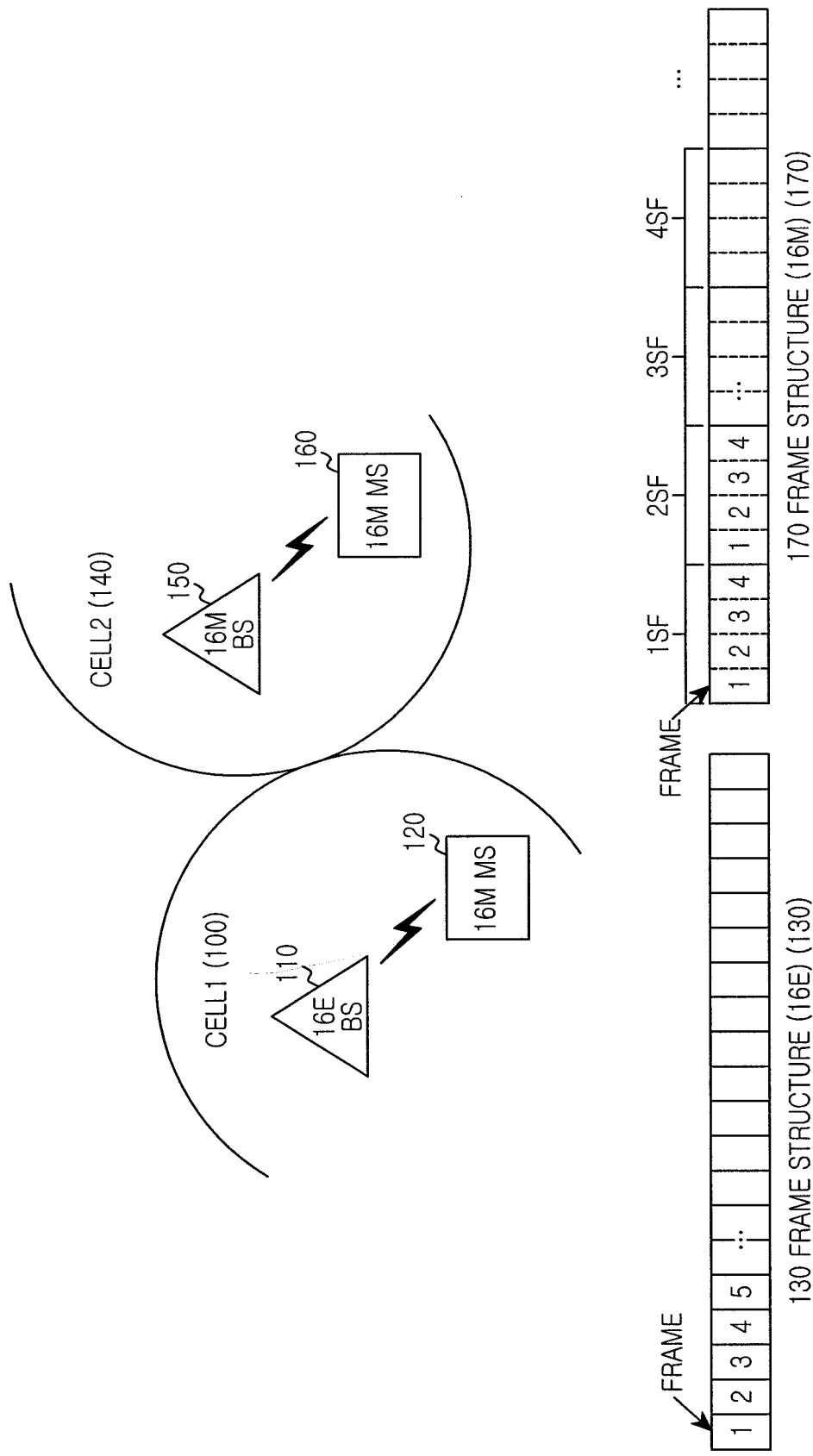
FIG. 1 illustrates an environment in which an Institute of Electrical and Electronics Engineers (IEEE) 802.16e communication system and an IEEE 802.16m communication system coexist according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus of a legacy Base Station (BS) for transmitting location information of a preamble of a new BS to a Mobile Station (MS) in a communication environment in which a legacy communication system and a new communication system coexist.

The term 'system' is the abbreviation of 'communication system' and refers to a basic environment for providing a communication service to the MS. Hereafter, the term 'system' can be used together with the BS, and refer to all of service providing entities such as relay station and Access Point (AP) as well as the BS.

Hereinafter, terms 'legacy system' and 'new system' correspond to systems based on different communication standards. In more detail, the term 'legacy system" corresponds to an existing system, and the term 'new system' corresponds to a system adopting a communication standard evolving from the existing system.

Although an Institute of Electrical and Electronics Engineers (IEEE) 802.16e system is explained as an example of the legacy system and an IEEE 802.16m system is explained as an example of the new system, exemplary embodiments of the present invention may be equally applied to the environment covering communication systems of different frame structures.

Hereafter, to ease the understanding, the IEEE 802.16e is referred to as 16e and the IEEE 802.16m is referred to as 16m.

FIG. 1 illustrates an environment including both of an IEEE 802.16e system and an IEEE 802.16m system according to an exemplary embodiment of the present invention.

Referring to FIG. 1, a first cell 100 includes a 16e BS 110 and a 16m MS 120 for communicating via the 16e BS 110. In the first cell 100, the 16e BS 110 and the 16m MS 120 communicate with each other based on a frame structure 130 supported by the 16e system. As an example, according to exemplary embodiments of the present invention, the frame structure 130 supported by the 16e system includes successive frames by 5 ms. In so doing, the 16e BS 110 transmits the preamble in every frame, and the 16m MS 120 identifies and scans the 16e BS 110 using the preamble.

Next, a second cell 140 includes a 16m BS 150 and a 16m MS 160 for communicating via the 16m BS 150. In the second cell 140, the 16m BS 150 and the 16m MS 160 communicate with each other based on a frame structure 170 supported by the 16m system. As an example, according to exemplary embodiments of the present invention, the frame structure 170 supported by the 16m system includes successive superframes (e.g., denoted by SF) by 20 ms, and each superframe includes four frames by 5 ms. The 16m BS 150 transmits the preamble per frame of the superframe. In particular, the 16m BS 150 transmits a secondary preamble in first, third, and fourth frames, and transmits a primary preamble in the second frame. The secondary preamble is used to identify and scan the 16m BS 150, and the primary preamble is used to acquire time synchronization with the 16m BS 150 and to acquire bandwidth information. Herein, the secondary preamble may not be transmitted in the fourth frame according to the system implementation.

As such, when the 16e system and the 16m system of the different frame structures coexist and the 16m MS 120 communicating with the 16e BS 110 intends to scan or hand over to the 16m BS 150, it is impossible for the 16m MS 120 to locate the preamble of the 16m BS 150 by itself and to perform the scanning or the handover while still receiving the service from the 16e BS 100. For example, the 16m MS 120 connected to the 16e BS 110 cannot know which frame time the secondary preamble of the 16m BS 150 is transmitted over based on the 16e frame. As a result, the 16m MS 120 can malfunction, miscalculate Carrier to Interference and Noise Ratio (CINR)/Received Signal Strength Indicator (RSSI)

measurement result, and scan the unnecessary frame. Thus, the scanning causes inefficient communication interruption.

Hence, exemplary embodiments of the present invention allow the 16e BS 110 to transmit the preamble information of the 16m BS 150 to the 16m MS 120 so that the 16m MS 120 can scan or hand over to the 16m BS 150.

For example, the legacy BS transmits the location information of the preamble of the new BS to the new MSs serviced by the legacy BS so that the new MSs can scan and hand over to the new BS.

According to exemplary embodiments of the present invention, to enable the legacy BS to provide the MS with the location (or point) information of the preamble of the new BS, a neighbor BS message (Mobile Neighbor Advertisement (MOB_NBR-ADV) or NBR_ABS-ADV) periodically broadcast by the legacy system can be used, or a unicast message (MOB_SCN-RSP) instructing the scanning to the MS or a unicast message (MOB_BSHO-REQ/RSP) instructing the handover to the MS can be used. Hereafter, the legacy BS transmits the location information of the preamble of the new BS to the MS using the neighbor BS message by way of example. Notably, exemplary embodiments of the present invention is equally applicable to the unicast message instructing the scanning to the MS or the unicast message instructing the handover to the MS, which carries the location information of the preamble of the new BS.

By means of the preamble location information of the new BS, the legacy BS can inform of the location of the frame carrying the secondary preamble as shown, for example, in Table 1, or the boundary of the superframe; that is, the frame location starting the header of the superframe as shown, for example, in Table 2.

Table 1 shows the structure of the preamble location information to indicate the location of the secondary preamble.

TABLE 1

| Preamble location in new type of base station | 0: in case of (N mode 2 == 0) <br> 1: in case of (N mode 2 == 1) <br> Here, N means the frame number in current base station |
|---|---|

Referring to Table 1, 'Preamble location in new type of base station' indicates the preamble location information of the new BS transmitted from the legacy BS to the new MS. Using the secondary preamble transmission over the first frame and the third frame in the frame structure of the 802.16m system of FIG. 1, 'Preamble location in new type of base station' indicates the start location of the frame carrying the secondary preamble of the new BS based on the frame number of the legacy BS. For example, with the frame number N, the legacy BS transmits the secondary preamble of the new BS in the frame interval (or time) of (N mode 2==0), or transmits the secondary preamble of the new BS in the frame interval of (N mode 2==1). For example, when the first frame and the third frame carrying the secondary preamble of the new BS start in the third frame and fifth frame intervals of the legacy BS, the frame of (N mode 2==1) carries the secondary preamble of the new BS. Accordingly, the new MS can know that the new BS transmits the secondary preamble in the N-th frame interval of (N mode 2==1) of the legacy BS. By contrast, when the first frame and the third frame carrying the secondary preamble of the new BS start in the second frame and fourth frame intervals of the legacy BS, the frame of (N mode 2==0) carries the secondary preamble of the new BS. Accordingly, the new MS can obtain that the new BS transmits the secondary preamble in the N-th frame interval of (N mode 2==0) of the legacy BS.

Table 2 shows the structure of the preamble location information indicating the superframe header carrying of the secondary preamble.

TABLE 2

| Preamble location in new type of base station | 0: in case of (N mode 4 == 0) <br> 1: in case of (N mode 4 == 1) <br> 2: in case of (N mode 4 == 2) <br> 3: in case of (N mode 4 == 3) <br> Here, N means the frame number in current base station |
|---|---|

Referring to Table 2, 'Preamble location in new type of base station' indicates the preamble location information of the new BS transmitted from the legacy BS to the new MS. Using, for example, the secondary preamble transmission over the first frame of the superframe header start in the frame structure of the 802.16m system of FIG. 1, 'Preamble location in new type of base station' indicates the start location of the superframe header of the new BS based on the frame number of the legacy BS. For example, with the frame number N of the legacy BS, the superframe header of the new BS starts in one of the frame intervals of (N mode 4==0), (N mode 4==1), (N mode 4==2), and (N mode 4==3). For example, when the first frame of the superframe header start of the new BS starts in the first frame interval of the legacy BS, the frame of (N mode 4==1) is the start of the superframe header of the new BS. Accordingly, the new MS can know that the new BS transmits the secondary preamble in the N-th frame interval of (N mode 4==1) of the legacy BS. By contrast, when the third frame of the legacy BS starts in the first frame interval of the superframe header start of the new BS, the frame of (N mode 4==3) is the superframe header start location of the new BS. Accordingly, the new MS can know that the new BS transmits the secondary preamble in the N-th frame interval of (N mode 4==3) of the legacy BS.

Based on the preamble location information of the new BS, the legacy BS can inform of the frame location carrying the secondary preamble or the frame location of the superframe header start as shown in Table 1 and Table 2.

Based on the preamble location information of the new BS, the legacy BS can inform the MS of an offset indicating the preamble location carrying the secondary preamble as shown in, for example, Table 3.

Table 3 shows the structure of the preamble location information indicating the offset of the location carrying the secondary preamble.

TABLE 3

| Offset to preamble in new type of base station | (N msec) <br> or (N frames) <br> or (N frames + M subframes) |
|---|---|

Referring to Table 3, 'Offset to preamble in new type of base station' is the preamble location information indicating the offset between a reference point and a transmission point of the secondary preamble of the new BS, and can indicate that the secondary frame of the new BS is transmitted after N milliseconds (msec), N frames, or N frames+M subframes from the reference point. Herein, the reference point may be the point when the legacy BS transmits the preamble location information, or the point when the MS receives the preamble location information. The preamble location information can indicate the secondary preamble transmission location of the new BS which is closest to the frame carrying the preamble location information. For example, the preamble location information is carried by any one of the neighbor BS message (MOB_NBR-ADV or NBR_ABS-ADV), the scanning indication message (MOB_SCN-RSP), and the handover indication message (MOB_BSHO-REQ/RSP) to thus inform that the secondary preamble transmission point of the new BS is after N milliseconds (msec), N frames, or N frames+M subframes based on the frame carrying the corresponding message.

Now, the case when the legacy BS transmits the location information of the preamble of the new BS using the neighbor BS message is explained in detail.

Figure 2:
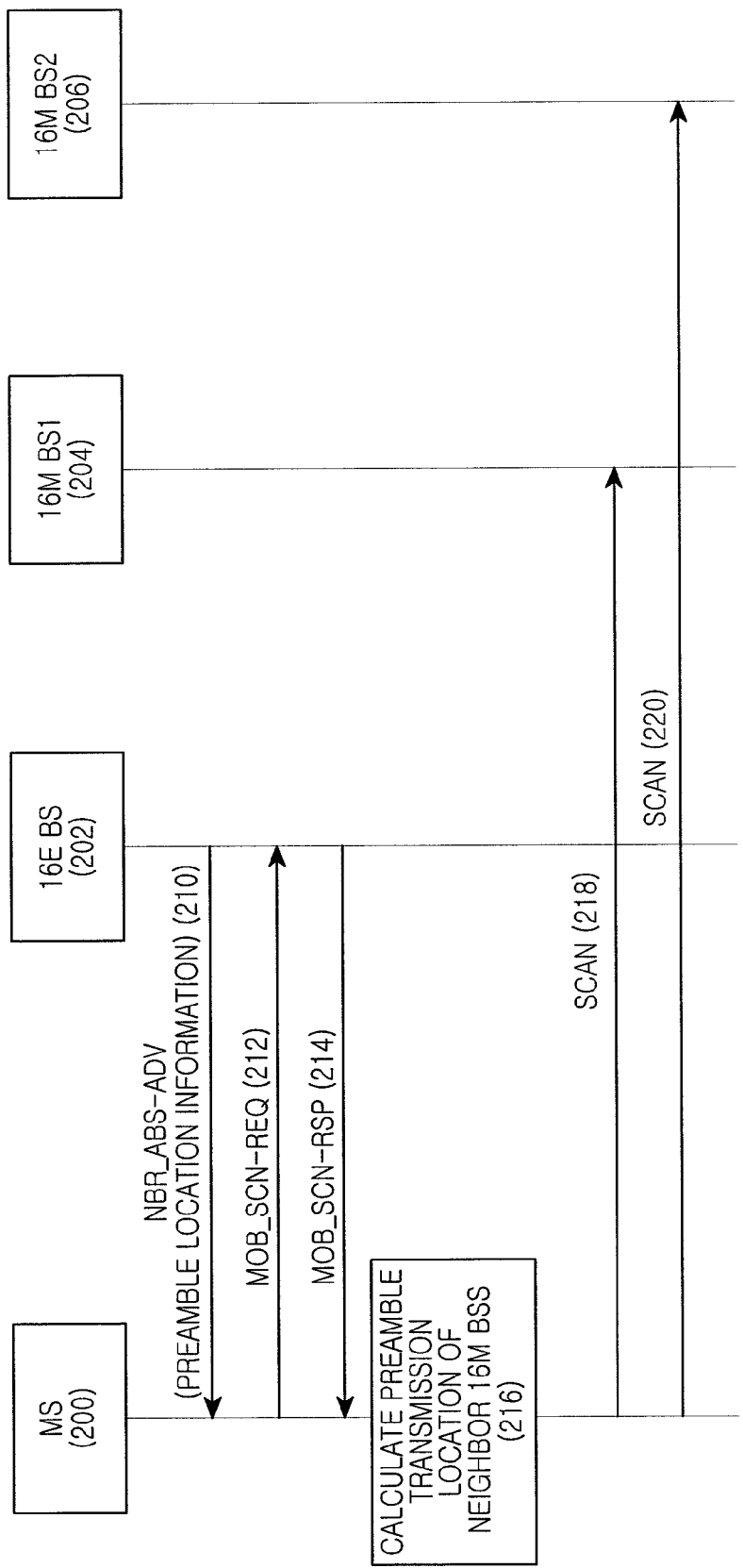
FIG. 2 illustrates signal flows of a Mobile Station (MS) for scanning a new Base Station (BS) in a communication environment covering both a legacy BS and the new BS according to an exemplary embodiment of the present invention.

FIG. 2 illustrates signal flows of the MS for scanning the new BS in the communication environment covering both the legacy BS and the new BS according to an exemplary embodiment of the present invention. Herein, when an MS 200 of the new system communicates with a 16e BS 202 which is the legacy BS and the 16e BS 202 is near a 16m BS1 204 and a 16m BS2 206 which are the new BSs, the MS 200 scans the 16m BS1 204 and the 16m BS2 206.

Referring to FIG. 2, the 16e BS 202 obtains information of the neighbor BSs, and sends the neighbor BS message (NBR_ABS-ADV) including the obtained neighbor BS information to the MS 200 in step 210. In so doing, the neighbor BS message includes the preamble location information of the 16m BS1 204 and the 16m BS2 206 as shown, for example, in Table 1, Table 2 and Table 3. The neighbor BS message can include system configuration information such as, for example, preamble index, BS ID, uplink channel information, and SuperFrame Header (SFH) of the neighbor 16m BS. The system configuration information can be used for the scanning or the handover of the MS 200. The neighbor BS message is the message carrying the neighbor BS information of the 16e BS 202 to the MS, and can include information of the neighbor BSs supporting the 16m system and information of the neighbor BSs supporting the 16e system. Herein, when the 16e BS and the 16m BS coexist as the neighbor BSs of the 16e BS 202, the neighbor BS message can include the 16e BS and the 16m BS as a separate list.

To scan the neighbor BS based on the information included in the neighbor BS message, the MS 200 transmits a scan request message (MOB SCH-REQ) to the 16e BS 202 in step 212. As an example, the scan request message can include the BS of the 16e system or the BS of the 16m system. Next, the 16e BS 202 transmits a scan response message (MOB_SCN-RSP) to the MS 200 in response to the scan request message in step 214.

When the scan request message and the scan response message include the 16m BS, the MS 200 obtains the preamble location information from the neighbor BS message and calculates the preamble transmission locations of the 16m BS1 204 and the 16m BS2 206 in step 216. In so doing, the MS 200 can obtain the preamble location information from the neighbor BS message as shown, for example, in Table 1, Table 2, or Table 3 and calculate the preamble transmission locations of the 16m BSs 204 and 206 based on the frame number of the 16e BS 202.

Next, the MS 200 scans the 16m BSs 204 and 206 based on the preamble transmission locations calculated for the 16m BSs 204 and 206 in steps 218 and 220.

Figure 3:
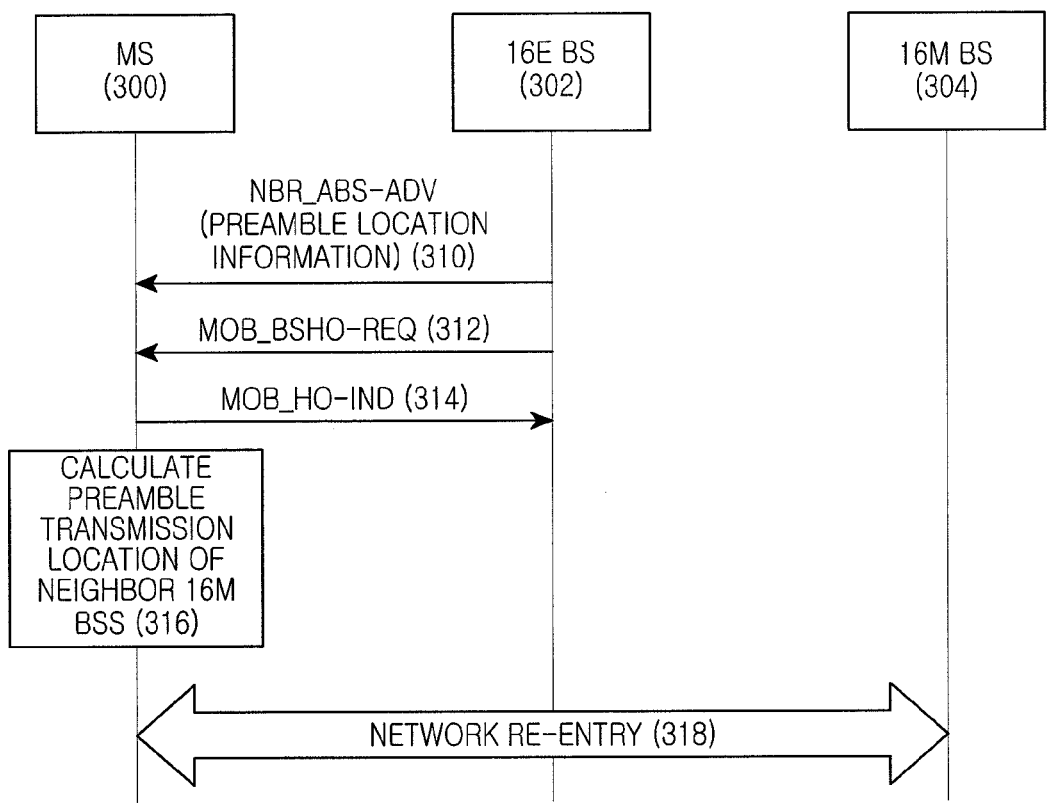
FIG. 3 illustrates signal flows of an MS for handing over to a new BS in a communication environment covering both a legacy BS and the new BS according to an exemplary embodiment of the present invention.

FIG. 3 illustrates signal flows of an MS for handing over to a new BS in a communication environment covering both a legacy BS and the new BS according to an exemplary embodiment of the present invention. Herein, when an MS 300 of the new system communicates with a 16e BS 302 which is the legacy BS and the 16e BS 302 is near a 16m BS 304 which is the new BSs, the MS 300 hands over to the 16m BS 304.

Referring to FIG. 3, the 16e BS 302 obtains information of the neighbor 16m BS 304, and sends the neighbor BS message (NBR_ABS-ADV) including the obtained neighbor BS information to the MS 300 in step 310. In so doing, the neighbor BS message includes the preamble location information of the neighbor 16m BS 304 as shown, for example, in Table 1, Table 2 and Table 3. The neighbor BS message can include the system configuration information such as, for example, preamble index, BS ID, uplink channel information, and SFH of the neighbor 16m BS. The system configuration information can be used for the scanning or the handover of the MS 300. The neighbor BS message is the message carrying the neighbor BS information of the 16e BS 302 to the MS, and can include information of the neighbor BSs supporting the 16m system and information of the neighbor BSs supporting the 16e system. Herein, when the 16e BS and the 16m BS coexist as the neighbor BSs of the 16e BS 302, the neighbor BS message can include the 16e BS and the 16m BS as a separate list.

The 16e BS 302 transmits to the MS 300 a handover request message (MOB_BSHO-REQ) instructing the handover to the 16m BS 304 in step 312.

In response to the handover request message, the MS 300 transmits a handover indication message (MOB_HO-IND) to the 16e BS 302 which is its serving BS in step 314. In step 316, the MS obtains the preamble location information of the 16m BS 304 from the neighbor BS message and thus calculates the preamble transmission location of the 16m BS 306. In so doing, the MS 300 can obtain the preamble location information from the neighbor BS message as shown, for example, in Table 1, Table 2, or Table 3 and calculate the preamble transmission locations of the 16m BS 304 based on the frame number of the 16e BS 302.

Next, the MS 300 hands over to the 16m BS 304 and performs a network re-entry procedure based on the preamble transmission location calculated for the 16m BS 304 in step 318.

Figure 4:
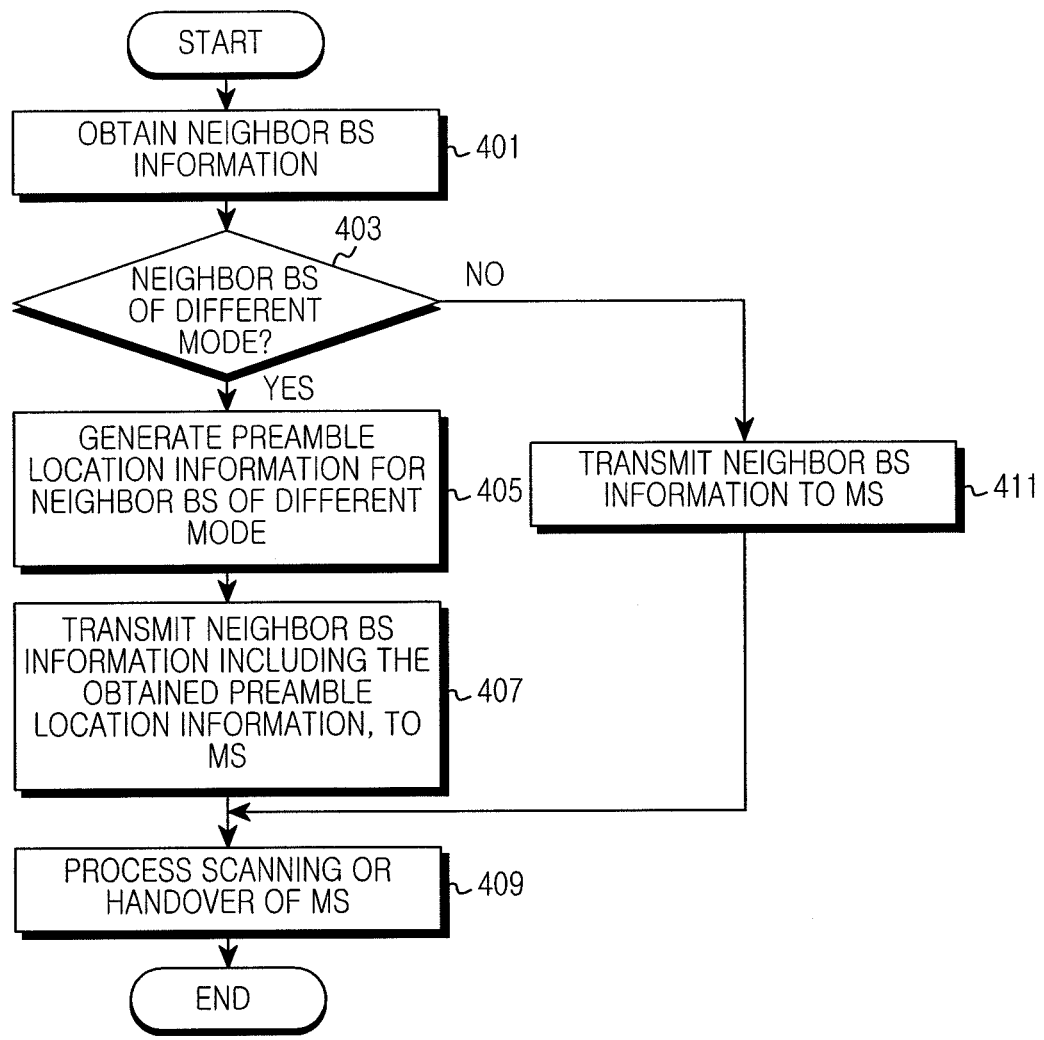
FIG. 4 illustrates operations of a legacy BS in a communication environment covering both the legacy BS and the a BS according to an exemplary embodiment of the present invention.

FIG. 4 illustrates operations of a legacy BS in a communication environment covering both the legacy BS and a new BS according to an exemplary embodiment of the present invention.

Referring to FIG. 4, the legacy BS obtains the neighbor BS information in step 401. Herein, the neighbor BS information may be received from a higher network entity which controls the legacy BS, or directly from the corresponding neighbor BS. According to exemplary embodiments of the present invention, the neighbor BS information may be received directly from a user. As an example, the neighbor BS information includes necessary information for generating the neighbor BS message transmitted from the legacy BS to the MS, and particularly includes frame time information of the neighbor BS.

In step 403, the legacy BS determines based on the obtained neighbor BS information whether there is the neighbor BS of the different mode. For example, the legacy BS determines whether the obtained neighbor BS information includes BS information of the new system which supports the different communication standard from the legacy BS.

When detecting the neighbor BS of the different mode, the legacy BS acquires the preamble location information of the neighbor BS of the different mode in step 405. Herein, using the frame time information of the neighbor BS of the different mode, the legacy BS locates the preamble transmission of the neighbor BS of the different mode and generates the preamble location information as shown, for example, in Table 1, Table 2, or Table 3. For example, the legacy BS generates the preamble location information indicating whether the preamble of the new BS is transmitted at the point corresponding to the even frame of the legacy system or at the point corresponding to the odd frame of the legacy system, by applying, for example, Table 1, Table 2, or Table 3. Based on Table 2, the legacy BS generates the preamble location information indicating which frame of the legacy system corresponds to the point of the SFH transmission of the new BS.

In step 407, the legacy BS transmits the neighbor BS information including the preamble location information to the MS of the new system communicating with the legacy BS. As an example, the legacy BS can transmit the neighbor BS information including the preamble location information to the MS using the neighbor BS message. According to the design, the legacy BS may transmit the unicast message instructing the scanning to the MS or the unicast message instructing the handover to the MS including the preamble location information to the MS.

Next, the legacy BS processes the scanning or the handover of the MS in step 409 and then finishes this process.

By contrast, when not detecting the neighbor BS of the different mode, the legacy BS transmits the obtained neighbor BS information to the MS as in the related art in step 411, processes the scanning or the handover of the MS in step 409, and then finishes this process.

Figure 5:
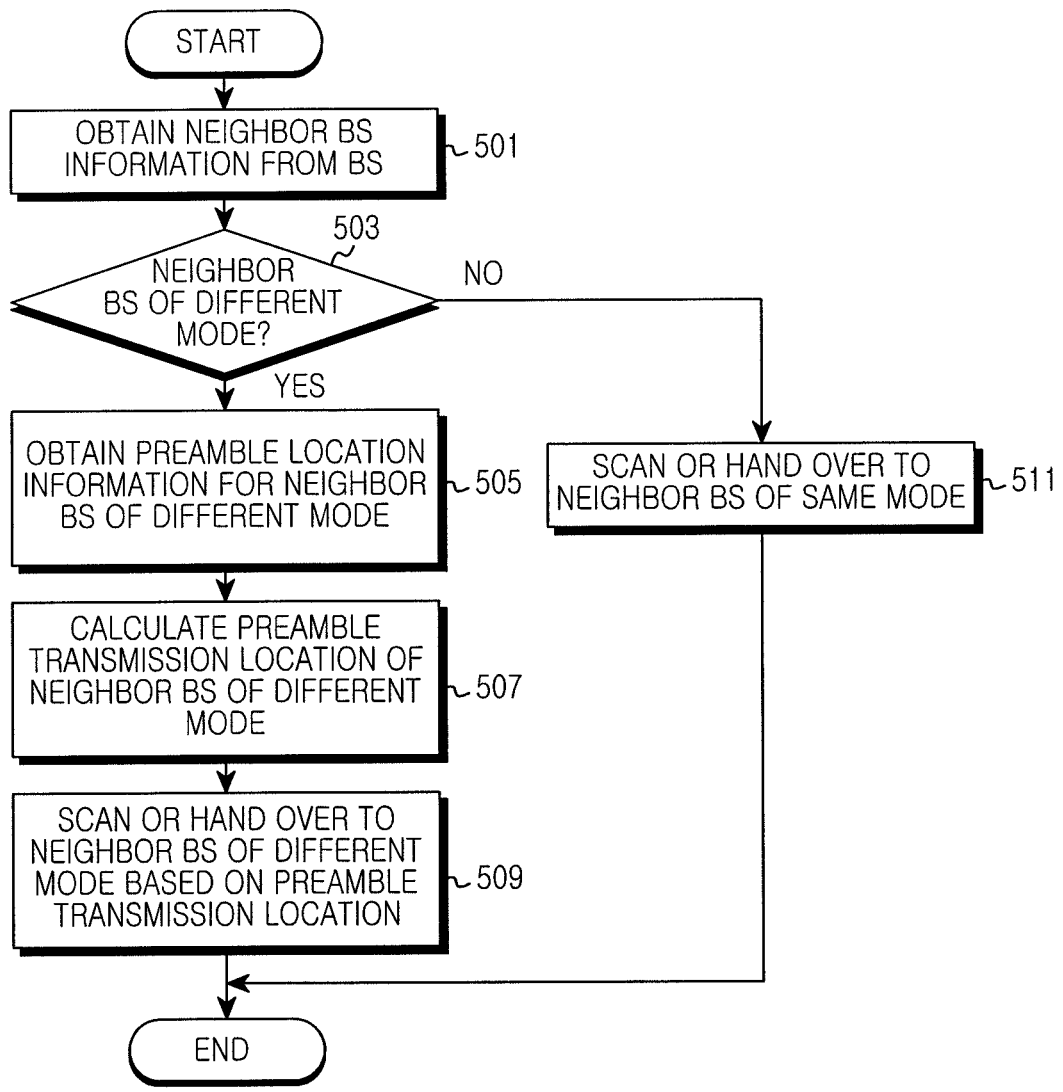
FIG. 5 illustrates operations of an MS in a communication environment covering both a legacy BS and a new BS according to an exemplary embodiment of the present invention.

FIG. 5 illustrates operations of an MS in a communication environment covering both a legacy BS and a new BS according to an exemplary embodiment of the present invention. Herein, the MS represents the MS of the new system in communication with the legacy BS.

Referring to FIG. 5, the MS obtains the neighbor BS information from the legacy BS which is its serving BS in step 501. For example, the MS receives the neighbor BS message (NBR_ABS-ADV) including the neighbor BS information from the legacy BS.

In step 503, the MS determines based on the neighbor BS information whether there is the neighbor BS of the different mode. For example, the MS determines whether the obtained neighbor BS information includes BS information of the new system which supports the different communication standard from the legacy BS. Herein, because the neighbor legacy BS information and the neighbor new BS information are distinguished as the separate lists in the neighbor BS message, the MS can determine whether the neighbor BS of the different mode exists in the neighbor BS message.

When detecting the neighbor BS of the different mode, the MS obtains the preamble location information of the neighbor BS of the different mode in step 505. As an example, the MS acquires the preamble location information of Table 1, Table 2, or Table 3 from the neighbor BS message received from the legacy BS. Herein, according to the design, the MS may obtain the preamble location information from the unicast message instructing the scanning to the MS or the unicast message instructing the handover the MS.

In step 507, the MS calculates the preamble transmission location of the new BS using the preamble location information based on the frame number of the legacy system. For example, when receiving the preamble location information of Table 1, the MS calculates whether the even frame or the odd frame of the legacy system carries the preamble of the new BS. When receiving the preamble location information of Table 2, the MS calculates which frame of the legacy system carries the SFH of the new BS. When receiving the preamble location information of Table 3, the MS calculates whether the SFH of the new BS is transmitted after N milliseconds, N frames, or N frames+M subframes based on the frame number of the received preamble location information in the legacy system.

The MS scans or hands over to the neighbor BS of the different mode based on the calculated preamble transmission location in step 509, and then finishes this process.

By contrast, when detecting no neighbor BS of the different mode, the MS scans or hands over to the neighbor BS of the same mode indicated by the neighbor BS information in step 511, and then finishes this process.

Figure 6:
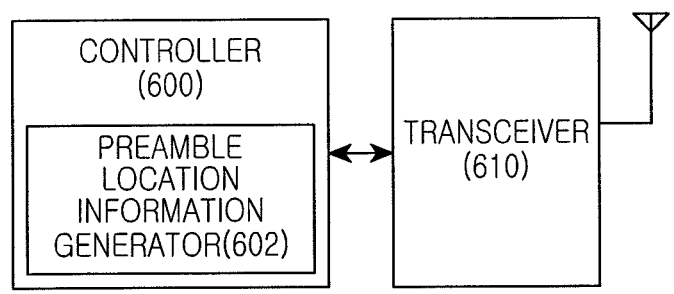
FIG. 6 illustrates a legacy BS according to an exemplary embodiment of the present invention.

FIG. 6 is a block diagram of a legacy BS according to an exemplary embodiment of the present invention.

Referring to FIG. 6, the legacy BS includes a controller 600 and a transceiver 610. The controller 600 includes a preamble location information generator 602.

According to exemplary embodiments of the present invention, the controller 600 controls and processes the operations of the BS. In particular, the controller 600 controls and processes the operations of FIG. 4. For example, the controller 600 obtains the neighbor BS information. When the neighbor BS information includes the BS of the different mode, the controller 600 generates the preamble location information of the BS of the different mode through the preamble location information generator 602 based on the frame time of the BS of the different mode. Herein, the preamble location information is generated based on the frame number of the legacy BS using, for example, Table 1, Table 2, or Table 3. When the preamble location information is generated, the controller 600 controls and processes to transmit the preamble location information to the MS using any one of the neighbor BS message, the unicast message instructing the scanning to the MS, and the unicast message instructing the handover to the MS.

Under control the controller 600, the transceiver 610 transmits and receives various data and messages to and from the MS.

Figure 7:
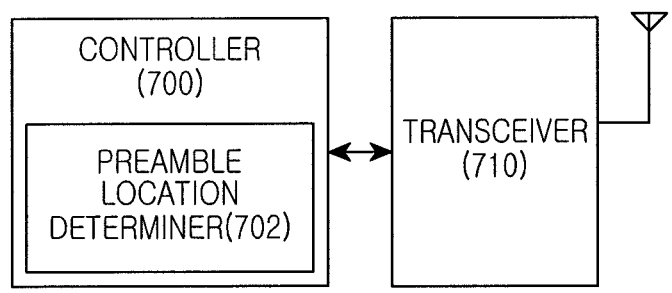
FIG. 7 illustrates an MS according to an exemplary embodiment of the present invention.

FIG. 7 is a block diagram of an MS according to an exemplary embodiment of the present invention.

Referring to FIG. 7, the MS includes a controller 700 and a transceiver 710. The controller 700 includes a preamble location determiner 702.

The controller 700 controls and processes the operations of the MS. In particular, the controller 700 controls and processes the operations of FIG. 5. For example, the controller 700 obtains the neighbor BS information from the legacy BS which is the serving BS. When the neighbor BS information includes the BS information of the different mode, the controller 700 determines the location of the preamble transmitted by the BS of the different mode through the preamble location determiner 702. Herein, the preamble location determiner 702 acquires the preamble location information of Table 1, Table 2, or Table 3 from the legacy BS, and determines the location of the preamble transmitted by the BS of the different mode based on the acquired preamble location information and the frame number of the legacy BS. Herein, the controller 700 can acquire the preamble location information using any one of the neighbor BS message, the unicast message instructing the scanning to the MS, and the unicast message instructing the handover to the MS.

Under control the controller 700, the transceiver 710 transmits and receives various data and messages to and from the legacy BS and the new BS.

The above-stated operations can be realized by a memory device storing corresponding program codes in a certain component of the BS or the MS. For example, each component of the BS or the MS can fulfill such operations by fetching and executing the program codes stored to the memory device through a processor or a Central Processing Unit (CPU).

As set forth above, in the communication environment including both of the legacy system and the new system, the legacy BS transmits the preamble location information of the new BS to the MS. Therefore, the MS serviced by the legacy BS can calculate the preamble transmission location of the new BS using the preamble location information and thus easily fulfill the scanning and the handover.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a serving base station (BS) supporting a first system, the method comprising:
    obtaining information of a superframe of a neighbor BS supporting a second system; and
    transmitting, by a serving BS, a message comprising information indicating a superframe boundary of the neighbor BS supporting the second system to a mobile station (MS),
    wherein the information indicating the superframe boundary comprises a result value of a modulo operation for frame numbers of the serving BS aligned with a first frame of the superframe of the neighbor BS,
    wherein the information of the superframe is obtained from a higher network entity, or the neighbor BS, or information stored in the serving BS.

2. The method of claim 1, wherein the message comprising the information indicating the superframe boundary is one of a neighbor BS message, a scan response message, and a handover indication message.

3. The method of claim 1, wherein the message comprising the superframe boundary information of the neighbor BS supporting the second system is periodically transmitted.

4. A method of a mobile station (MS) supporting a first system and a second system, the method comprising:
    receiving a message comprising information indicating a superframe boundary of a neighbor base station (BS) supporting the second system, from a serving BS supporting the first system,
    wherein the information indicating the superframe boundary comprises a result value of a modulo operation for frame numbers of the serving BS aligned with a first frame of the superframe of the neighbor BS.

5. The method of claim 4, wherein the message comprising the information indicating the superframe boundary is one of a neighbor BS message, a scan response message, and a handover indication message.

6. The method of claim 4, further comprising:
    performing at least one of:
        scanning for a BS supporting the second system based on the received superframe boundary information; and
        handing over to the BS supporting the second system based on the received superframe boundary information.

7. The method of claim 4, wherein the identifying of the BS supporting the second system comprises:
    determining a preamble transmission location of the neighbor BS supporting the second system based on the superframe boundary information of the neighbor BS supporting the second system.

8. An apparatus of a serving base station (BS) supporting a first system, the apparatus comprising:
    a controller for obtaining information of a superframe of a neighbor BS supporting a second system; and
    a transceiver for transmitting a message comprising information indicating a superframe boundary of the neighbor BS supporting the second system to a mobile station (MS),
    wherein the information indicating the superframe boundary comprises a result value of a modulo operation for frame numbers of the serving BS arranged with a first frame of the superframe of the neighbor BS,
    wherein the information of the superframe is obtained from a higher network entity, or the neighbor BS, or information stored in the serving BS.

9. The apparatus of claim 8, wherein the message comprising the information indicating the superframe boundary is one of a neighbor BS message, a scan response message, and a handover indication message.

10. The apparatus of claim 8, wherein the message comprising the superframe boundary information of the neighbor BS supporting the second system is periodically transmitted.

11. An apparatus of a mobile station (MS) supporting a first system and a second system, the apparatus comprising:
    a transceiver for receiving a message comprising information indicating a superframe boundary of a neighbor base station (BS) supporting a second system, from a serving BS supporting the first system,
    wherein the information indicating the superframe boundary comprises a result value of a modulo operation for frame numbers of the serving BS arranged with a first frame of the superframe of the neighbor BS.

12. The apparatus of claim 11, wherein the message comprising the information indicating the superframe boundary is one of a neighbor BS message, a scan response message, and a handover indication message.

13. The apparatus of claim 11, wherein the controller controls to perform at least one of:
    scanning for a BS supporting the second system based on the received superframe boundary information; and
    handing over to the BS supporting the second system based on the received superframe boundary information.

14. The apparatus of claim 11, wherein the controller determines a preamble transmission location of the neighbor BS supporting the second system based on the received superframe boundary information of the neighbor BS supporting the second system.

15. The method of claim 1, wherein the result value indicates a value of modulo 4 for the frame numbers of the serving BS aligned with the first frame of the superframe of the neighbor BS.

16. The method of claim 4, wherein the result value indicates a value of modulo 4 for the frame numbers of the serving BS aligned with the first frame of the superframe of the neighbor BS.

17. The apparatus of claim 8, wherein the result value indicates a value of modulo 4 for the frame numbers of the serving BS aligned with the first frame of the superframe of the neighbor BS.

18. The apparatus of claim 11, wherein the result value indicates a value of modulo 4 for the frame numbers of the serving BS aligned with the first frame of the superframe of the neighbor BS.

* * * * *